STANDBY POWER FOR A RETENTIVE MEMORY LOGIC CIRCUITRY

Filed May 18, 1964

INVENTOR.

Robert C. Mierendorf

BY

Harold J. Rathbun

Atty.

United States Patent Office 3,249,769
Patented May 3, 1966

3,249,769
STANDBY POWER FOR A RETENTIVE MEMORY LOGIC CIRCUITRY

Robert C. Mierendorf, Wauwatosa, Wis., assignor to Square D Company, Park Ridge, Ill., a corporation of Michigan Filed May 18, 1964, Ser. No. 368,051
5 Claims. (Cl. 307—88.5)

This invention relates to transistorized logic control systems, and more particularly to an improved means for imparting a retentive characteristic to transistorized NOR memory elements of static logic control systems.

Transistorized logic circuitry has been used in static control systems to an increasing degree over the past few years because of the inherent reliability, low power requirements, and relatively fast switching times of such circuitry. The systems comprise a plurality of logic elements in various combinations to provide the required logic functions such as AND, OR, NOT, NOR, and MEMORY. It has become common practice to employ transistorized NOR elements as building blocks in such systems inasmuch as substantially all other logic functions can be obtained conveniently by combinations of NOR elements.

A problem, however, may be encountered when using a pair of NOR elements as a memory inasmuch as such a memory element does not inherently possess a retentive characteristic. The memory element tends to stabilize in its "natural" state upon the reapplication of power after a failure or interruption of power. The "natural" state may or may not correspond to the last selected bi-stable state of the memory element. The "natural" state is determined by the characteristics of the individual transistors and the impedance values of the associated circuitry.

Means have been used previously to provide a retentive characteristic for transistorized NOR memory elements. One such means, disclosed in U.S. Patent No. 3,108,258, issued October 22, 1963, and assigned to the assignee of the present invention, comprises a half-wave magnetic amplifier having opposing and aiding control windings. In the event of failure or interruption of power, the magnetic amplifier causes a NOR memory element to retain its last selected bi-stable state depending upon the presence or absence of residual flux in the magnetic core as determined by the interaction of the associated control windings. Although a system employing such a magnetic amplifier is suitable for a great many applications, there are others for which it is not suitable and which require a somewhat less complicated and yet reliable method of providing a retentive characteristic for NOR memory elements.

Accordingly, it is an object of the present invention to provide an improved means for imparting a retentive characteristic to transistorized NOR memory elements.

Another object is to provide improved transistorized NOR memory circuitry which includes means for retaining the last selected bi-stable state of each of several NOR memory elements upon resumption of primary power after failure or interruption of the primary power source.

A more specific object is to provide a standby power source for maintaining one or more transistorized NOR memory elements in their respective last-selected, bi-stable states after the primary power source becomes inoperative as by failure or interruption, and wherein the standby power source includes a battery continuously charged while primary power is available and which becomes operative to supply sufficient holding power to the NOR memory elements during times when primary power is not available.

The invention is described as it might be applied in a static control system made up of various logic elements, some of which are individual transistorized NOR elements connected so as to provide a NOR memory element. The static control system is powered by a primary power source operating from a nominal 120 volt source of 60 cycle alternating current. The invention pertains to the provision of a standby power source which enables the NOR memory elements in the control system to retain their last selected bi-stable states during failure or interruption of operating power from the primary power source and its subsequent reapplication. The standby power source includes a pair of rechargeable batteries one of which is connected between a negative power supply lead and ground and the other of which is connected between a positive power supply lead and ground. Each battery is arranged in cooperative relation with a resistor and a plurality of diodes interconnected so as to insure that the batteries continuously receive an appropriate trickle charge during the time primary power is available. Upon failure or interruption of the primary power, the batteries supply the minimum power requirements to only those NOR memory elements desired to be made retentive while at the same time the batteries are effectively prevented from discharging through the primary power source or other logic circuitry.

Further objects and features of the invention will be readily apparent from the following specification and appended drawings, in which.

Figures 1, 2, 3:
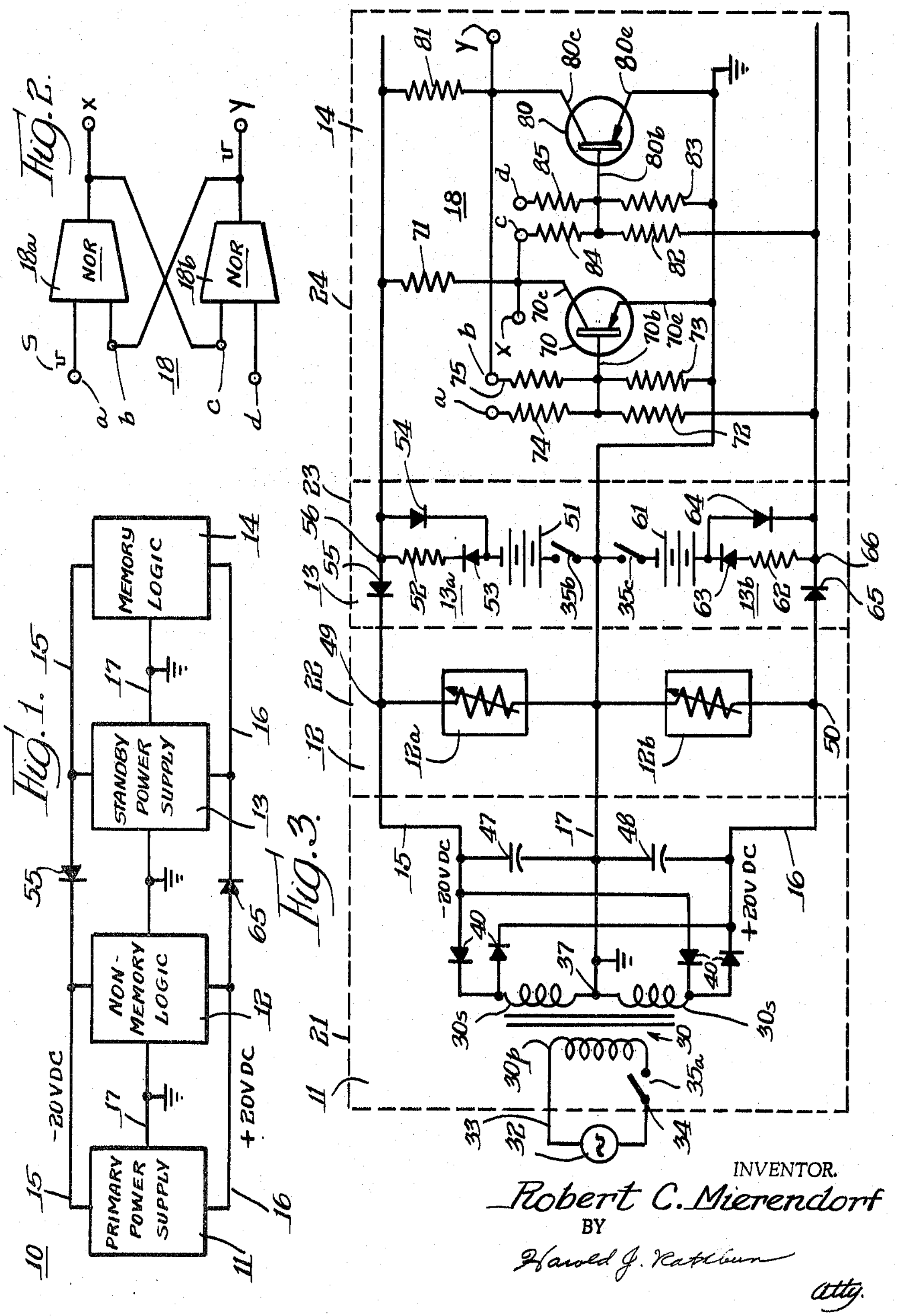
FIG. 1 is a block diagram of an exemplary static logic control system employing transistorized logic circuitry and including an embodiment of the present invention.
FIG. 2 is a diagrammatic representation of a conventional NOR memory element made up of a pair of NOR elements.
FIG. 3 is a schematic wiring diagram of FIG. 1.

Referring to FIG. 1, a static control system 10 comprises a primary power supply section 11, a non-memory logic circuit section 12, a standby power supply section 13, and a memory logic circuit section 14. The primary power supply section 11 supplies the operating power requirements to the logic circuitry sections 12 and 14 over power leads 15 and 16, which respectively supply a negative potential, e.g. 20 volts, and a positive potential, e.g. 20 volts, with respect to a ground or common lead 17. The standby power section 13 is connected in parallel with the primary power section 11. The logic circuit sections 12 and 14 comprise a plurality of conventional NOR elements which may be combined, as is well known, to provide the required logic functions such as AND, OR, NOT, and MEMORY. Although not so indicated in the drawing, the section 12 may include, in addition to non-memory logic elements, some memory logic elements which do not need to be retentive.

In FIG. 2, a pair of transistorized NOR elements **18*a* and 18*b* are shown combined to form a NOR memory element 18 of the type in the memory logic circuit section 14** of FIG. 1. The structure and operation of a transistorized NOR element is well known so that detailed description is not necessary. In general, a negative voltage pulse, indicated at S, impressed on either one of a pair of inputs *a* or *b* of the NOR element **18*a* results in the absence of an output signal at an output X of the NOR element 18*a***. Similarly, a negative pulse S impressed on either of a pair of inputs *c* and *d* of the NOR element **18*b* results in the presence or absence of an output signal at Y of the NOR element 18*b***. The absence of a signal is customarily referred to as "zero" and the presence of a signal as "one."

To form the NOR memory circuit element 18, the output Y of the NOR element **18*b*** is connected to the input b of the NOR element 18a, and the output X of the NOR element 18a is connected to the input c of the NOR element 18b. A "one" signal at the input a of the NOR element 18a causes the signal at the output X to be "zero" which, when combined with the absence of signal at the input d causes a "one" signal at the output Y. The "one" signal at the output Y is impressed on the input b of the NOR element 18a to maintain the NOR memory circuit element 18 in this bi-stable state, even though the signal S is removed from the input a. The NOR memory element 18 is switched to the other of its bi-stable states by applying an input signal S to the input d. This changes the output at Y to "zero" which, when impressed on the input b and combined with an absence of a signal at the input a, changes the "zero" signal at the output X to a "one" signal. The "one" signal at the output X is impressed on the input c to maintain the NOR memory element 18 in this bi-stable state upon removal of the input signal S from the input d.

Referring to FIG. 3, the portion within the rectangle formed by broken lines 21 is the primary power supply 11, the portion within the rectangle formed by broken lines 22 is the non-memory logic circuitry 12; the portion within the rectangle formed by broken lines 23 is the standby power supply 13; and the portion within the rectangle formed by broken lines 24 is the memory logic circuitry 14 which includes one or more NOR memory elements 18.

The primary power supply 11 includes a transformer 30 having a primary winding 30p supplied from a suitable alternating current source 32 through a pair of conductors 33 and 34. A switch 35a is interposed in the conductor 34 and other switches 35b and 35c are provided for a purpose which will become apparent. The transformer 30 further includes a secondary winding 30s which is center-tapped at 37. The output terminals of the secondary winding 30s are connected through a full-wave rectifier comprising a plurality of diodes 40 to provide unidirectional voltage at the power supply leads 15 and 16 which are respectively at a negative potential and at a positive potential relative to the ground lead 17 connected to the center tap 37. The output of the rectifier is filtered by capacitors 47 and 48 which are connected between the respective power supply leads 15 and 16 and the ground lead 17.

The non-memory or non-retentive memory circuitry 12 is shown diagrammatically as a variable load 12a connected between a terminal 49 on the power supply lead 15 and the ground lead 17, and a variable load 12b connected between a terminal 50 on the power supply lead 16 and the ground lead 17.

The standby power supply 13 in accordance with this invention comprises a negative power source indicated at 13a and a positive power source indicated at 13b. The negative power source 13a comprises a rechargeable battery 51, a resistor 52, the switch 35b and a plurality of diodes 53, 54, and 55. The resistor 52 and the diode 53 are connected in series betwen the negative terminal of the battery 51 and a terminal 56 on the negative power supply lead 15. The positive terminal of the battery 51 is connected to the ground lead 17 through the switch 35b. The diode 54 is connected between the terminal 56 on the power supply lead 15 and the junction between the diode 53 and the negative terminal of the battery 51 while the diode 55 is interposed in the power supply lead 15 between the terminals 49 and 56. The diodes 53 and 55 are poled so as to permit a trickle charge to be carried through the resistor 52 to the battery 51 from a primary power supply 11, and the diode 54 is poled to provide a low impedance path through which the battery 51 can supply current to the power supply lead 15.

Similarly, the positive power supply 13b includes a rechargeable battery 61, a resistor 62, the switch 35c and a plurality of diodes 63, 64, and 65. The resistor 62 and the diode 63 are connected in series between the positive terminal of the battery 61 and a terminal 66 and on the positive power supply lead 16. The negative terminal of the battery 61 is connected to the ground lead 17 through the switch 35c. The diode 64 is connected between the terminal 66 on the positive power supply lead 16 and the junction between the diode 63 and the positive terminal of battery 61, and the diode 65 is interposed in the power supply lead 16 between the terminals 50 and 66. The diodes 63 and 65 are poled so as to permit a trickle charge to be carried through the resistor 62 to the battery 61 from the primary power supply 11, and the diode 64 is poled to provide a low impedance path through which the battery 61 can supply current to the power supply lead 16.

The memory logic section 14 is shown in FIG. 3 as including one of the NOR memory elements 18 shown diagrammatically in FIG. 2 which memory element comprises a pair of transistors 70 and 80 as the switching elements. The transistor 70 has a base 70b, a collector 70c, and an emitter 70e, while the transistor 80 has a base 80b, a collector 80c, and an emitter 80e. The collector 70c is connected to the negative power supply lead 15 at a point on the load side of the terminal 56 through a resistor 71 while the emitter 70e is connected directly to the ground lead 17. Base bias for the transistor 70 is provided by a bleeder network formed by a pair of series connected resistors 72 and 73. The non-common end of the resistor 72 is connected to the positive power supply lead 16 at a point on the load side of the terminal 66, and the non-common end of the resistor 73 is connected to the ground lead 17. The common terminals of the resistors 72 and 73 are connected to the base 70b. A pair of resistors 74 and 75 are interposed between the two input terminals a and b, respectively, and the base 70b.

Similarly, the collector 80c of the transistor 80 is connected to the negative power supply lead 15 at a point on the load side of the terminal 56 through a resistor 81 while the emitter 80e is connected directly to the ground lead 17. Base bias is provided by a bleeder network formed by a pair of series connected resistors 82 and 83. The non-common end of the resistor 82 is connected to the positive power supply lead 16 at a point on the load side of the terminal 66, and the non-common end of the resistor 83 is connected to the ground lead 17. The common terminals of the resistors 82 and 83 are connected to the base 70b. A pair of resistors 84 and 85 are interposed between the two input terminals c and d, respectively, and the base 80b.

Although only one NOR memory element 18 is shown in the section 14, it will be obvious that additional NOR memory elements 18 can be connected in a similar manner and in parallel with the one shown.

In operation, when the switch 35a is closed, the primary power supply 11 supplies power to the non-memory logic circuitry 12 and to the memory logic circuitry 14 over the power supply leads 15 and 16 and the common lead 17. It will continue to supply such power as long as switch 35a is closed and the alternating current source 32 is functioning. At the same time, with the switches 35b and 35c closed, trickle charges are continuously applied to the batteries 51 and 61. The trickle charge for the battery 51 is supplied through a circuit including the diode 55, the resistor 52 and the diode 53. The trickle charge for the battery 61 is applied through a circuit including the diode 65, the resistor 62 and the diode 63. The magnitude of the respective trickle charges so applied to the rechargeable batteries 51 and 61 is determined by the value selected for the series resistors 52 and 62, respectively. In general, the magnitude of the trickle charges should be at a level which, although having no deleterious effect on the batteries when applied over extended periods of time, will recharge the batteries 51 and 61 from a completely discharged condition in a relatively short time.

Upon failure of the alternating current source 32 or a malfunctioning of the primary power supply 11, operating power supplied therefrom over the power supply leads 15 and 16 and ground lead 17 is interrupted. As previously mentioned, the memory element 18 tends to stabilize at its "natural" state upon the reapplication of the primary operating power. This may or may not correspond to the last selected bi-stable state prior to the interruption of power from the primary power supply 11. To prevent this stabilization from occurring, the standby power supply 13 supplies sufficient holding or standby power to the memory element 18 to insure that it will maintain the last selected state until and after primary operating power is reapplied. The standby power is supplied automatically when the potential of the batteries 51 and 61 becomes greater than the potential supplied by the primary power supply 11. Current from the battery 51 is supplied to the negative power supply lead 15 through a low impedance path provided by the diode 54 while a similar low impedance path is provided to the positive power supply lead 16 through the diode 64 for the battery 61. Standby power thus furnished by the batteries 51 and 61 is prevented from being discharged through the primary power supply 11 and the logic circuitry 12*a* and 12*b* by the respective diodes 55 and 65 which are poled to block flow of current in that direction.

It should be emphasized that the batteries 51 and 61 need supply standby power at a potential and in an amount sufficient only to maintain each of the NOR memories 18 in the memory logic circuitry 14 of the static control system 10 in the last selected states thereof prior to the interruption of the primary power. In this respect, the level of potential supplied by the standby power supply 13 may be somewhat less than the level of potential supplied by the primary power supply 11. In practice, using a primary power supply which furnishes power at 20 volts, it has been found that the batteries 51 and 61 may be of a type which furnish 12 volts. Further, it should also be emphasized that the battery 51 supplying the negative potential during standby operation must supply a greater power demand than the battery 61. The battery 61 supplies positive potential only to insure transistor stability and prevent any excessive leakage current, which may be present at elevated temperatures, from causing any of the NOR memory circuits 18 to change states. For this reason, the power drawn from the battery 61 is small when compared to the power drawn from the battery 51. Consequently, any duty cycle which can be handled by the battery 51 is well within permissible design limits for the battery 61. In practice, it has been found that the standby power supply 13, having 12-volt batteries 51 and 61, can adequately maintain up to twelve of the NOR memory circuits 18 connected in parallel under a duty cycle of 20% on and 80% off.

I claim:

1. In an electrical control system, the combination comprising: a transistorized logic memory circuit having a selectable bistable switchable state of operation, a non memory logic circuit, a primary power source connected to supply operating D.C. power having a predetermined potential to both circuits, and means for maintaining the memory circuit in its last switched bistable state in event the primary source becomes inoperative, said means including: a standby power source including a rechargeable battery having an operating potential less than the predetermined potential of the primary source, means connecting the battery in parallel with both circuits and the primary source including means for preventing the battery from supplying power to the primary source and the non memory logic circuit during the period the primary source is inoperative.

2. In an electrical control system, the combination comprising: a transistorized logic memory circuit having a selectable bistable switchable state of operation, a non memory logic circuit, a primary power source connected to supply operating D.C. power having a predetermined potential to both circuits, and means for maintaining the memory circuit in its last switched bistable state in event the primary source becomes inoperative, said means including: a standby power source including a rechargeable battery having an operating potential less than the predetermined potential of the primary source, means connecting the battery in parallel with both circuits and the primary source including means for preventing the battery from supplying power to the primary source and the non memory logic circuit during the period the primary source is inoperative, and means for supplying the battery with charging current when the primary source is operative.

3. In an electrical control system, the combination comprising: a transistorized logic memory circuit having a selectable bistable switching state of operation, a non memory logic circuit, each of said circuits having a first terminal for applying a predetermined negative potential between said first terminal and a reference point and a second terminal for applying a predetermined positive potential between the second terminal and the reference point, a primary power source connected to both terminals and the reference point to supply D.C. power having a predetermined potential to both circuits, and means for maintaining the memory circuit in its last switched bistable state in event the primary source becomes inoperative, said means including: a first rechargeable battery having its positive terminal connected to said reference point and its negative terminal connected to said first terminal through a first circuit means, a second rechargeable battery having its negative terminal connected to said reference point and its positive terminal connected to said second terminal through a second circuit means, each of said batteries having a potential less than the predetermined potential supplied by the primary source and thereby inoperative to supply power to the first and second terminals when the primary source is operative, means in said first and second circuit means for preventing the first and the second batteries from supplying power to the primary source and the non memory logic circuit when the primary source is inoperative, means in said first and second circuit means providing a path for a trickle charging current for both batteries when the primary source is operative, and means in said first and second circuit means providing a low impedance path between the batteries and the terminals of the memory circuit to provide sufficient power to the memory circuit from both batteries to maintain said memory circuit in its last selected bistable state whenever the potential supplied by the primary source is less than the potential supplied by the batteries.

4. In an electrical control system, the combination comprising: a transistorized NOR logic memory circuit having a selectable bistable switching state of operation, a non memory logic circuit, each of said circuits having a first terminal for applying a predetermined negative potential between said first terminal and a reference point and a second terminal for applying a predetermined positive potential between the second terminal and the reference point, a primary power source connected to both terminals and the reference point to supply D.C. power having a predetermined potential to both circuits, and means for maintaining the memory circuit in its last switched bistable state in event the primary source becomes inoperative, said means including: a first rechargeable battery having its positive terminal connected to said reference point and its negative terminal connected to said first terminal through a first circuit means, a second rechargeable battery having its negative terminal connected to said reference point and its positive terminal connected to said second terminal through a second circuit means, each of said batteries having a potential less than the predetermined potential supplied by the primary source and thereby being inoperative to supply power to the first and second terminals when the primary source is operative, means including a diode in each of said first and second circuit means for preventing the first and the second batteries from supplying power to the primary source and the non memory logic circuit when the primary source is inoperative, means including a resistor and diode in each of said first and second circuit means providing a path for a trickle charging current for both batteries when the primary source is operative, and means including a diode in parallel circuit with the resistor in each of said first and second circuit means to provide a low impedance path between the batteries and the terminals of the memory circuit for providing sufficient power to the memory circuit from both batteries to maintain said memory circuit in its last selected bistable state whenever the potential supplied by the primary source is less than the potential supplied by the batteries.

5. In an electrical control system, the combination comprising: a transistorized logic memory circuit having a selectable bistable switching state of operation, a non memory logic circuit, each of said circuits having a first terminal for applying a predetermined negative potential between said first terminal and a reference point and a second terminal for applying a predetermined positive potential between the second terminal and the reference point, a primary power source connected to both terminals and the reference point to supply D.C. power having a predetermined potential to both circuits, and means for maintaining the memory circuit in its last switched bistable state in event the primary source becomes inoperative, said means including: a first battery having its positive terminal connected to said reference point and its negative terminal connected to said first terminal through a first circuit means, a second battery having its negative terminal connected to said reference point and its positive terminal connected to said second terminal through a second circuit means, each of said batteries having a potential less than the predetermined potential supplied by the primary source and thereby inoperative to supply power to the first and second terminals when the primary source is operative, means in said first and second circuit means for preventing the first and the second batteries from supplying power to the primary source and the non memory logic circuit when the primary source is inoperative, and means in said first and second circuit means providing a low impedance path between the batteries and the terminals of the memory circuit to provide sufficient power to the memory circuit from both batteries to maintain said memory circuit in its last selected bistable state whenever the potential supplied by the primary source is less than the potential supplied by the batteries.

References Cited by the Examiner

UNITED STATES PATENTS

| | | | |
|---|---|---|---|
| 3,049,623 | 8/1962 | Du Vall | 307—88.5 |
| 3,108,191 | 10/1963 | Bagno | 307—88.5 |
| 3,159,755 | 12/1964 | Duncan | 307—88.5 |

JOHN W. HUCKERT, *Primary Examiner.*

ARTHUR GAUSS, *Examiner.*

J. D. CRAIG, *Assistant Examiner.*